(No Model.) 2 Sheets—Sheet 1.
M. G. HUBBARD.
VEHICLE SPRING.
No. 423,159. Patented Mar. 11, 1890.
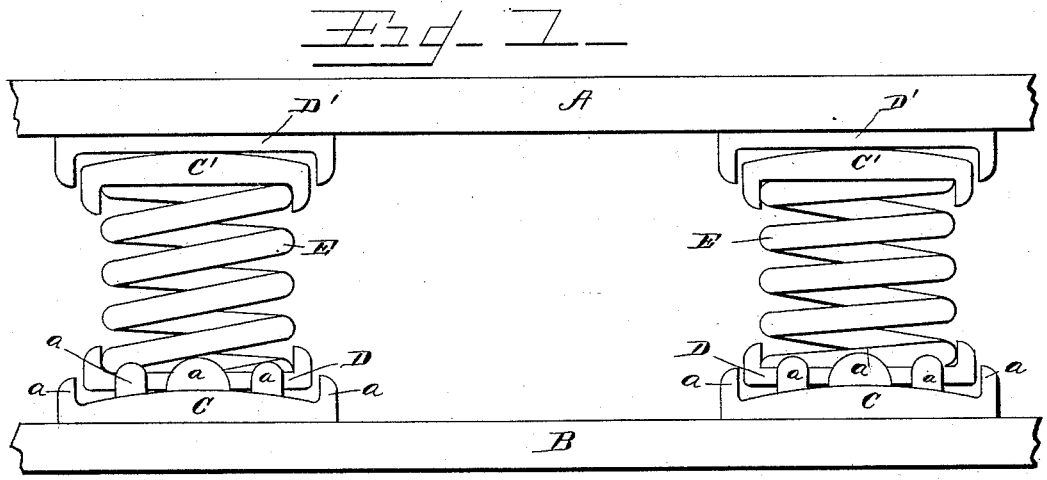
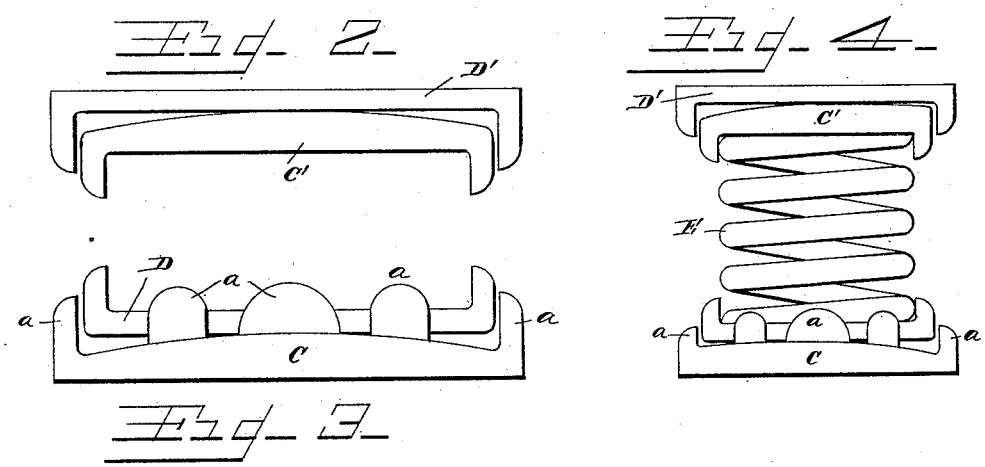
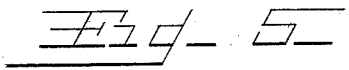
Witnesses: Moses G. Hubbard, Inventor,
By his Attorneys A. M. Smith & Son.

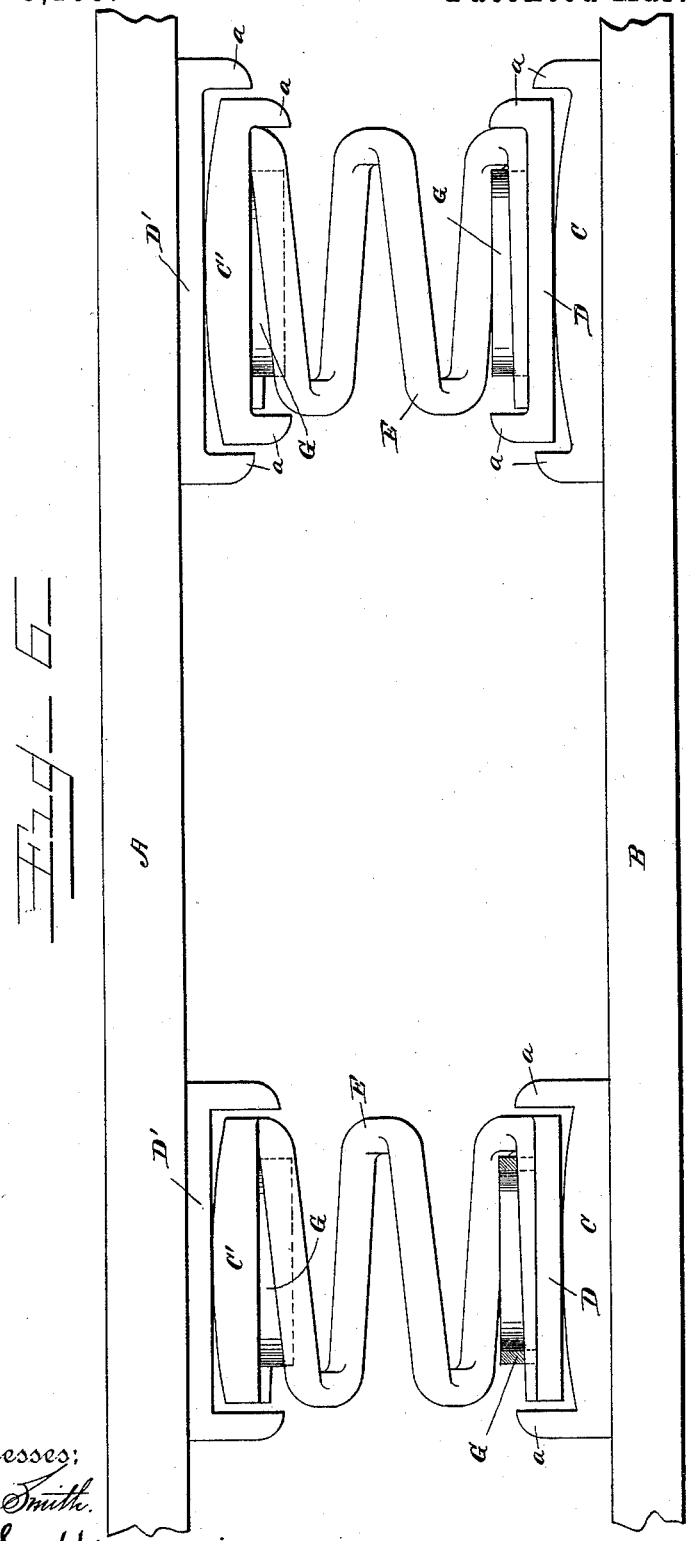

UNITED STATES PATENT OFFICE.

MOSES G. HUBBARD, OF CHICAGO, ILLINOIS.

VEHICLE-SPRING.

SPECIFICATION forming part of Letters Patent No. 423,159, dated March 11, 1890.

Application filed January 7, 1890. Serial No. 336,128. (No model.)

*To all whom it may concern:*

Be it known that I, MOSES G. HUBBARD, a citizen of the United States, and a resident of Chicago, county of Cook, and State of Illinois, have invented a new and useful Improvement in Springs for Wheeled Vehicles, of which the following is a full, clear, and exact description, reference being had to the accompanying drawings, making part of this specification.

My invention relates to means for providing for lateral or horizontal movement of the body of a wheeled vehicle relative to the axle or spring-supporting platform thereof; and it consists in combining a vertical spring with one or more rockers for increasing the lateral or horizontal freedom of the spring and for checking its lateral movement gradually, and to other details of construction. In the use of the ordinary vertical spring—such as the coiled or elliptic spring—it is customary to rely upon the horizontal elasticity of the spring or to combine it with swinging links or small rollers or balls to attain sufficient horizontal freedom; but so far as I am aware all previous plans have lacked durability and been too expensive for practical adoption.

My invention will be understood by reference to the accompanying drawings, forming a part of this specification, and in which—

Figure 1 is an end elevation showing a portion of the body or bolster of a vehicle resting upon two vertical spiral springs combined with rockers formed of the segments of a large cylinder. Fig. 2 shows an upper rocker and bearing detached; Fig. 3, a lower rocker and bearing. Fig. 4 shows a spring and rockers adapted to produce an effect similar to swinging links considerably inclined. Fig. 5 shows the rocker formed of the segment of a large sphere. Fig. 6 shows my new spring combined with the rocker.

In Fig. 1 the effect of the rockers is to permit a lateral movement similar to that permitted by vertical swinging links by imparting freedom and then gradually checking it.

A indicates the lower portion of the body of a vehicle; B, the axle or spring-supporting platform; C, the base-plate, on the upper surface of which the lower rocker should be formed; and D is the flat-bottomed cup for holding the spring E, and when a rocker is used also on the upper end of the spring it is similarly arranged. Lugs or ears *a a* serve to keep the springs and spring-cups in place, and are located a sufficient distance apart to permit the ready escape of any dirt that might otherwise accumulate between the working-surfaces.

Both of the rockers should have their curved surfaces on their upper sides, as shown, to incline the dust to work off, and so keep the working-surfaces clean.

In Fig. 4 the rockers are so inclined by making one side of the plate thicker than the other, that they will rise more in one direction than in the other, and in this form they may be so located one on each side of a vehicle that they will act in a manner similar to inclined swinging links; but if the rockers stand level their effect is similar to that of vertical links.

When lateral freedom only is desired, the rockers are made in the form of segments of a large cylinder; but when horizontal freedom in all directions is desired the rocker is made in the form of a segment of a large sphere, as shown in Fig. 5.

The large circle of the rockers gives great durability and freedom of horizontal or lateral movement without the friction and consequent wear and expense of the ordinary swinging links, small rollers, or balls, and also the effect of the rockers is to gradually check the horizontal movement of the body of the vehicle, which is very important.

For use in ordinary spring-vehicles I find that to make the curve of the rockers on a circle of a diameter about four times the height of the spring gives very satisfactory results; but of course the form of the rockers may be varied, just as the length of the links has heretofore been varied to accommodate different positions and requirements. The swinging link is probably the best device heretofore adopted for this purpose, as it not only gives the lateral freedom of movement required, but it also gradually checks the movement by increasing the angle of the link; but my invention accomplishes both results equally well and in a cheaper, more convenient, and much more durable manner. It is also practicable to attain the effect of the inclined swinging links by locating the springs constructed as shown in Fig. 1 in such manner that the upper or lower ends of the springs are nearer together than their opposite ends, as an equivalent of the arrangement shown in Fig. 4. I find that the spring-caps, when constructed as described, combined with my improved spring more fully described in my pending application, Serial No. 293,934, filed December 18, 1888, are of special service in preventing any change of position circumferentially. This is often desirable when the springs vary or when ornamented on their exposed sides and for other reasons. In Fig. 6 is shown a pair of my said straight-sided spiral springs in combination with the flanged spring-caps extending around them in such manner as to held them in position both horizontally and circumferentially. The rim or flange on the spring-cap may be on the inner side of the spring, as shown at G in Fig. 6, and when so constructed the upper and lower caps may be made less in diameter and save metal and give the whole a neater appearance when used in an exposed position. For most styles of spring-vehicles I prefer to combine the flanged caps and the rockers with my said straight-sided springs, as shown in Fig. 6, by which I attain all of the important results above enumerated.

The rocker is formed in an arc of a circle the radius of which is greater than the vertical length of the spring, so that when the rocker is vibrated to one side or the other of its normal position it tends either to raise the load or to compress the spring, or both, the load resting on the spring being thus made to resist the rocking movement, and when raised tends to restore the rocker to its normal position, exactly as is done by the swinging links referred to.

Having now described my invention, I claim as new—

1. The combination of a vertical spring with a rocker the rocking-face of which is in an arc of a circle of greater radius than the vertical length of the spring, whereby the lateral or horizontal freedom of the spring is increased and its movement gradually checked by the action of the load on the rocker, substantially as and for the purpose described.

2. The combination of the spring with rockers the curved rocking-faces of which are inclined relatively to the spring, whereby the lateral action is made to resemble the action of springs and the ordinary swinging inclined links, substantially as and for the purpose described.

3. The combination of a spiral spring having straight sides and rounded corners with a flanged spring-cap conforming to the sides of said spring, whereby the spring is held in position both circumferentially and horizontally, as and for the purpose specified.

4. The combination of a vertical spiral spring with a spring-cap and a rocker-plate, one of which has flanges inside of the spring, the other having flanges outside of the spring, substantially as and for the purpose set forth.

5. The lower cap having the separated retaining lugs or ears arranged outside of the spring for permitting the escape of obstructing matter, in combination with the rocker-plate located within said cap-plate, substantially as and for the purpose described.

In testimony whereof I have hereunto set my hand this 21st day of December, A. D. 1889.

MOSES G. HUBBARD.

Witnesses:
W. S. BURLING,
J. CLIFFORD GOULD.